United States Patent
Momose (10) Patent No.: US 7,061,231 B2
(45) Date of Patent: Jun. 13, 2006

(54) DEVICE FOR MEASURING DISPLACEMENT INCLUDING A DISPLACEMENT SENSOR WITH A DETECTION COIL AND EXCITATION COILS

(75) Inventor: Shogo Momose, Nagano (JP)

(73) Assignee: Sanko Seiki Mfg. Co., Ltd., Nagano (JP)

( * ) Notice: Subject to any disclaimer, the term of this patent is extended or adjusted under 35 U.S.C. 154(b) by 66 days.

(21) Appl. No.: 10/481,628

(22) PCT Filed: Jun. 18, 2002

(86) PCT No.: PCT/JP02/06042

§ 371 (c)(1),
(2), (4) Date: Jun. 14, 2004

(87) PCT Pub. No.: WO03/001144

PCT Pub. Date: Jan. 3, 2003

(65) Prior Publication Data

US 2004/0207391 A1    Oct. 21, 2004

(30) Foreign Application Priority Data

Jun. 20, 2001    (JP) ............................. 2001-186417

(51) Int. Cl.
*G01B 7/30*    (2006.01)
(52) U.S. Cl. ........................... 324/207.17; 324/207.25; 324/228
(58) Field of Classification Search ............................... 324/207.11–207.26, 160–179, 228–229, 324/232, 242, 243; 336/20; 194/317, 320, 194/327
See application file for complete search history.

(56) References Cited

U.S. PATENT DOCUMENTS

| | | | | |
|---|---|---|---|---|
| 4,591,785 A | * | 5/1986 | Hoehn, Jr. ................... | 324/239 |
| 4,647,854 A | * | 3/1987 | Yamada et al. ......... | 324/207.12 |
| 4,716,366 A | * | 12/1987 | Hosoe et al. .......... | 324/207.12 |
| 5,103,173 A | * | 4/1992 | Honkura et al. ............ | 324/239 |
| 5,117,181 A | * | 5/1992 | Clergeot et al. ....... | 324/207.18 |
| 5,512,821 A | * | 4/1996 | Ando et al. .................. | 324/225 |

FOREIGN PATENT DOCUMENTS

| | | | |
|---|---|---|---|
| JP | 59-009501 | * | 1/1984 |
| JP | 61-151402 | * | 7/1986 |
| JP | 05-272906 | * | 10/1993 |
| JP | 2002-174501 | * | 6/2002 |

* cited by examiner

Primary Examiner—Jay Patidar
(74) Attorney, Agent, or Firm—Harness, Dickey & Pierce, P.L.C.

(57) ABSTRACT

A displacement measuring device for detecting a relative position of an object by interposing the object between a set of at least two displacement sensors. The displacement sensor may comprise of a core body that includes a detection coil and a pair of excitation coils. The sensor may produce a differential output based on the balance of the magnetic flux between the excitation coils with satisfactory linearity and/or higher sensitivity, in which the impedance due to the DC resistance component or the like is removed.

10 Claims, 8 Drawing Sheets

DEVICE FOR MEASURING DISPLACEMENT INCLUDING A DISPLACEMENT SENSOR WITH A DETECTION COIL AND EXCITATION COILS

TECHNICAL FIELD TO WHICH THE INVENTION RELATES

This invention relates to a displacement measuring device provided with a displacement sensor which detects a relative position with respect to an object to be detected.

BACKGROUND ART

Figure 12:
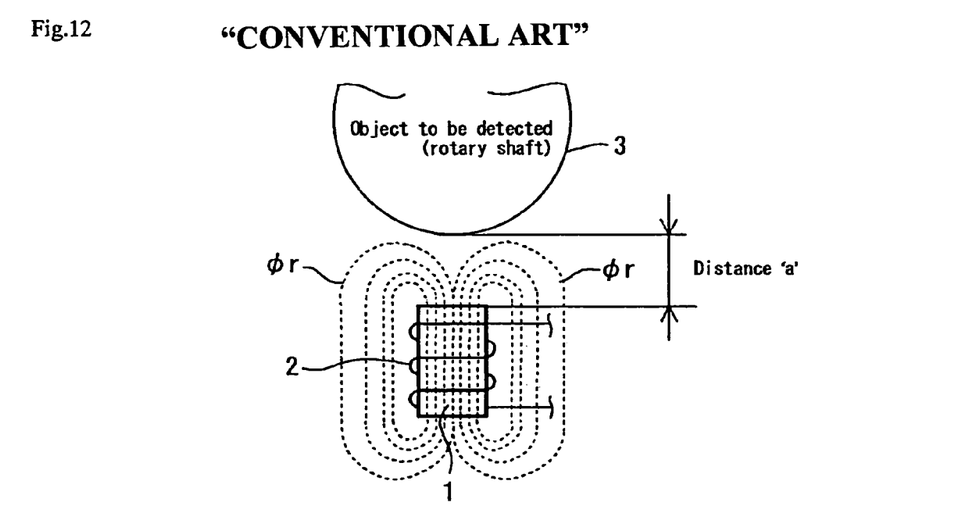
FIG. 12 is an explanatory side view showing a schematic constitution of a conventional displacement sensor.
Figure 13:
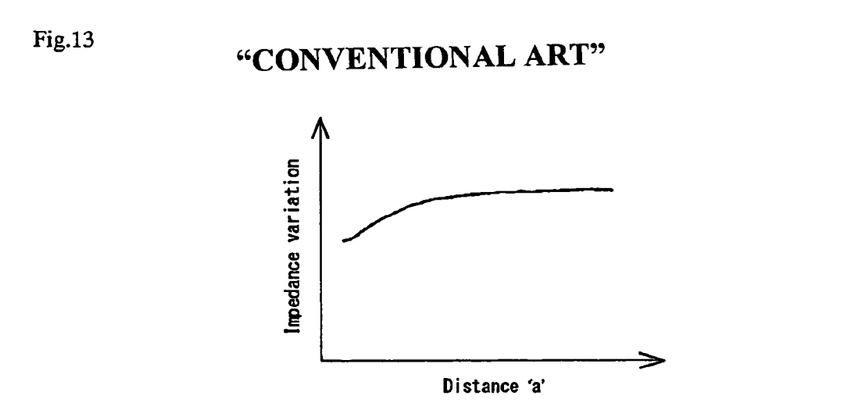
FIG. 13 is a graph showing a detection output of the conventional displacement sensor shown in FIG. 12.

Generally, a displacement measuring device provided with a displacement sensor is used in a variety of appliances such as a magnetically levitated type motor. One example of this type of device is disclosed in Japanese Patent Unexamined Publication No. HEI 6-269144. The displacement sensor which is usually used is referred to as an eddy current type sensor and constituted as shown in FIG. 12. In FIG. 12, an electric current flows through a coil 2 wound around a rod-shaped core body 1 to generate a magnetic flux $\phi r$ for detection. When an object 3 to be detected such as a metal rotation shaft and the core body 1 are relatively approached to or separated from each other under the magnetic field formed by the magnetic flux $\phi r$ for detection, the magnitude of eddy current generated in the object 3 varies corresponding to the variation of the distance between the object 3 and the core body 1 and the magnetic reluctance also varies in accordance with its variation. Therefore, a detection output as shown in FIG. 13 is obtained by detecting the variation of inductance for the variation of the magnetic reluctance.

Figure 14:
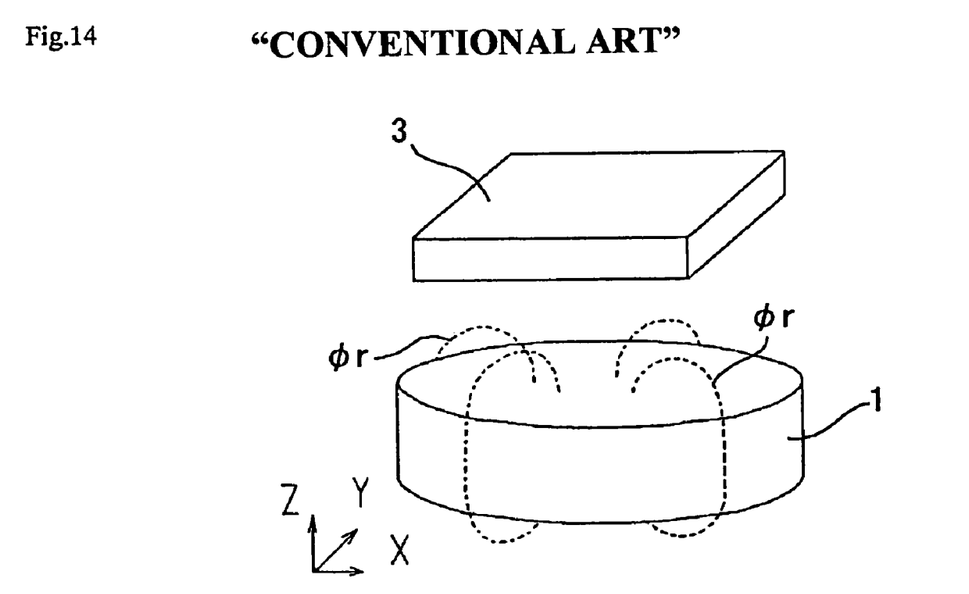
FIG. 14 is an explanatory perspective appearance view showing a schematic constitution of a conventional displacement sensor.

However, in such a conventional type displacement measuring device, the final detection output corresponds to the impedance variation because a DC resistance component is contained in the magnetic reluctance variation including air between the core body 1 and the object 3 to be detected. As a result, in this conventional type displacement sensor, the sensitivity of the detection output is still not sufficient and further, a favorable temperature characteristic is not obtained by the influence of the DC resistance component, the temperature variation of the permeability of the core body or the like. Moreover, since the variation of magnetic reluctance in the air between the core body 1 and the object 3 is proportional to the square of the distance, the linearity of the detection output is not satisfactory. Furthermore, as shown in FIG. 14, when the amount of the variation is enlarged by means of using the variation of three dimensional magnetic flux $\phi r$, the size of the entire device is increased. Also, since the impedance is varied by changing the length of a cable connecting with a sensor amplifier, the amplifier is required to be adjusted corresponding to it.

Therefore, it is an object of the present invention to provide a displacement measuring device which is capable of obtaining a stable detection result with simple constitution and appropriate detection sensitivity.

DISCLOSURE OF THE INVENTION

In order to achieve the above-mentioned object, according to the present invention set forth in claim 1, there is provided a displacement measuring device provided with a displacement sensor which is constituted in such a manner that an output is varied in accordance with a variation of relative positional relationship with respect to an object to be detected and the object is detected on the basis of the variation of the output, characterized in that a sensor set including a pair of displacement sensors oppositely arranged so as to interpose the object between the pair of displacement sensors is disposed, the respective displacement sensors in the sensor set are respectively constituted in such a manner that an excitation coil and a detection coil are respectively wound around and mounted on a core body on the same axis, one of the excitation coil and the detection coil is mounted on a center core part disposed at a generally center portion in an axial direction of the core body, the other of the excitation coil and the detection coil is mounted on a pair of axial end core parts respectively, which are disposed at both end portions in an axial direction of the core body, the axial direction of the core body is disposed in a generally same direction as a varying direction of relative position with respect to the object, and one of the pair of axial end core parts and the object are approached to or separated from each other while opposing each other.

In other words, in the displacement measuring device having such a constitution, the excitation coil and the detection coil are discretely arranged in each displacement sensor and, moreover, detection is performed based on the balance between the pair of excitation coils or the pair of detection coils. Therefore, the quantity of the variation of magnetic flux is directly measured regardless of the impedance including the DC resistance component or the like. Accordingly, an output with high sensitivity can be obtained with a small core body and moreover a stable detection operation can be attained with an inexpensive circuit regardless of an environmental temperature variation without using a conventional constant current circuit. As a result, a stable detection result can be obtained with a simple constitution while satisfactory detection sensitivity is obtained, and thus performance and reliability of the displacement measuring device can be improved.

Also, in accordance with the present invention set forth in claim 2, at least two sensor sets which are respectively comprised of the pair of opposed displacement sensors set forth in claim 1 are arranged so as to be positioned in the direction perpendicular to each other. Therefore, the displacement detecting operation can be performed with extremely high sensitivity and high resolution.

Furthermore, in accordance with the present invention set forth in claim 3, the core body set forth in claim 1 is comprised of one piece of a plate shaped member and a face of the axial end core part in the thickness direction is opposed to the object to be detected. Therefore, the core body can be made thinner and further miniaturization can be attained.

Furthermore, in accordance with the present invention set forth in claim 4, a width dimension of the axial end core part set forth in claim 1 in the direction perpendicular to the axial direction is formed smaller than the width dimension of the above-mentioned center core part. In accordance with the displacement sensor set forth in claim 5, the width dimension of the axial end core part set forth in claim 4 is set to be not more than half of the width dimension of the central core part.

As described above, since the axial end core part positioned to be close to the object to be detected is formed to be narrower, the current efficiency in the axial end core part can be improved, and detection sensitivity can be further enhanced by generating more magnetic flux.

Also, in accordance with the displacement measuring device set forth in claim 6, engaging flange parts which respectively protrude in the widthwise direction are provided at each boundary portion between the central core part and the axial end core parts set forth in claim 4, and the winding positions of the excitation coil and the detection coil are regulated at a specified position by the engaging flange part.

As described above, when the winding position of each coil can be accurately restricted by providing the engaging flange part at the boundary portion between the central core part and the axial end core part, a phase shift or an output shift is reduced and a large variation rate can be obtained.

Also, in accordance with the displacement measuring device set forth in claim 7, a comparison metal body is arranged so as to face the axial end core part on the opposite side of the axial end core part facing the object to be detected set forth in claim 4.

As described above, when the difference between the detection output from the object to be detected and the detection output from the comparison metal body is detected as the quantity of variation, the starting position in a detection region required for the object to be detected can be set at "zero" output by means of changing the reference distance between the comparison metal body and the axial end core part or changing the material of the comparison metal body. Accordingly, a large output variation is obtained to enhance detection accuracy and resolution and to obtain satisfactory linearity.

Furthermore, in the displacement measuring device set forth in claim 8, the excitation coil set forth in claim 1 includes a pair of coil winding portions, which are arranged so that opposite magnetic fields are formed on the same axis. According to such a constitution, since one output in a differential state which is formed by the pair of excitation coils is obtained, further accurate detection with high sensitivity can be attained

BRIEF DESCRIPTION OF THE DRAWINGS

FIG. 5(a) shows a case that one displacement sensor is used and FIG. 5(b) shows a case that a pair of displacement sensors is used.

FIG. 10(a) shows a cylindrical shaped core body and FIG. 10(b) shows a square shaped core body.

BEST MODE FOR CARRYING OUT THE INVENTION

Preferred embodiments of the present invention will be described in detail below with reference to the accompanying drawings.

Figure 3:
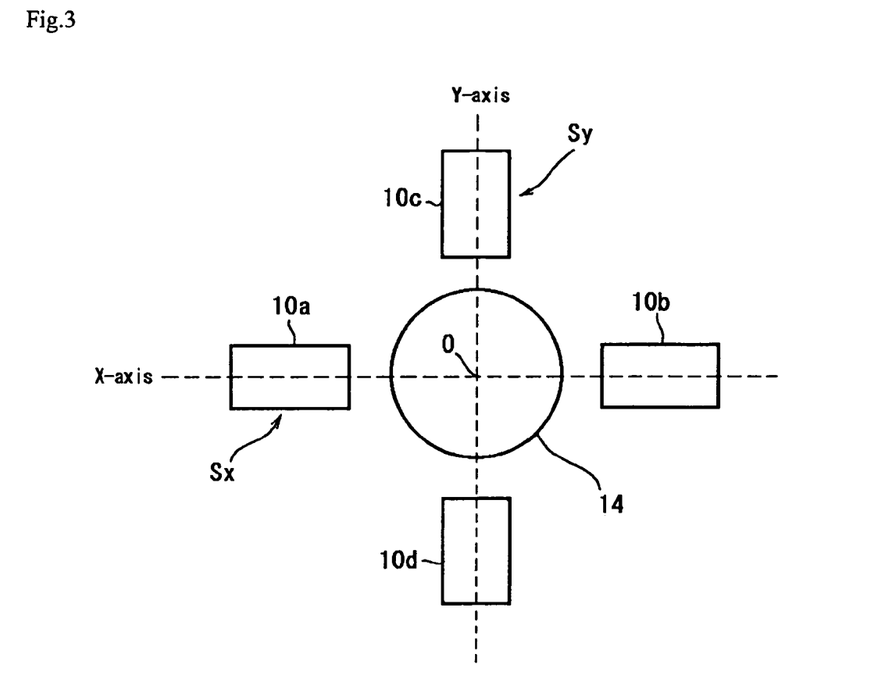
FIG. 3 is an explanatory front view showing arrangement of the displacement sensor in the displacement measuring device for the magnetically levitated type motor shown in FIGS. 1 and 2.

An embodiment shown in FIG. 3 is an example in which the present invention is applied to a magnetically levitated type motor. A description will be made first as to an overview of a magnetically levitated type motor before the constitution of the displacement measuring device shown in FIG. 3 is described. For example, as disclosed in Japanese Patent Unexamined Publication No. Hei 6-269144, magnetic poles to which unipolar windings are respectively applied are formed in an inner peripheral face of a hollow cylinder-shaped stator mounted in a motor case and a rotor having a permanent magnet is disposed with a prescribed gap with respect to the inner peripheral face of the stator. The rotating magnetic field of the number of poles of M±2 along the inner peripheral face of the stator is generated by a predetermined control means with respect to the magnetic poles of M poles provided in the rotor in such a manner that levitation force is obtained by the interaction between the rotary magnetic field and the permanent magnet of the rotor. That is, an electric current for rotating the rotor is superimposed on an electric current for obtaining the levitation force and these currents are supplied to the windings of the stator to perform rotation and magnetic levitation of the rotor.

As described above, in the embodiment shown in FIG. 3, a rotary shaft 14 is used as the object to be detected and four displacement sensors 10a, 10b, 10c and 10d are arranged so as to surround the rotary shaft 14 as a center. These four displacement sensors 10a, 10b, 10c and 10d are disposed so as to constitute two sensor sets Sx and Sy, which are respectively disposed on two axes extending so as to be perpendicular to each other at a geometric center position "O" of the rotary shaft 14, that is, on each of an X-axis and a Y-axis. A pair of the displacement sensors 10a and 10b constituting the sensor set Sx is opposedly arranged so as to interpose the rotary shaft 14 from both sides on the X-axis with an appropriate gap. Also, a pair of displacement sensors 10c and 10d constituting the other sensor set Sy is opposedly disposed so as to interpose the rotary shaft 14 from both sides on the Y-axis with an appropriate gap in the vertical direction in the drawing.

Figure 1:
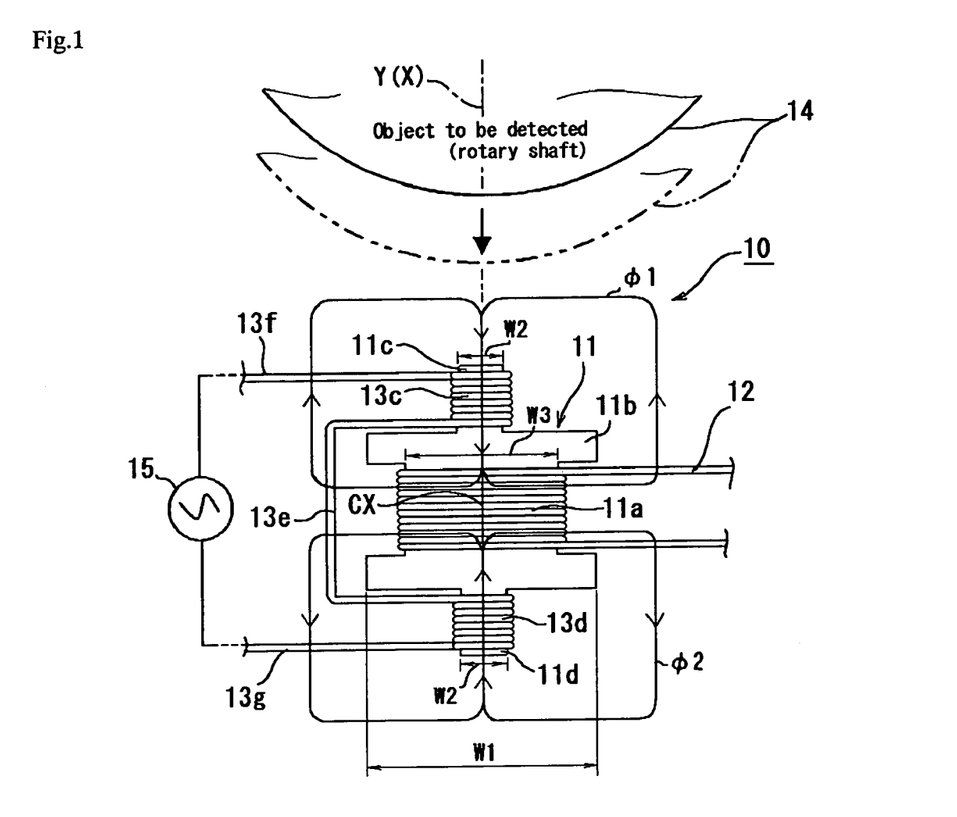
FIG. 1 is an explanatory side view showing a schematic constitution of a displacement sensor which is used in a displacement measuring device for a magnetically levitated type motor to which the present invention is applied.
Figure 2:
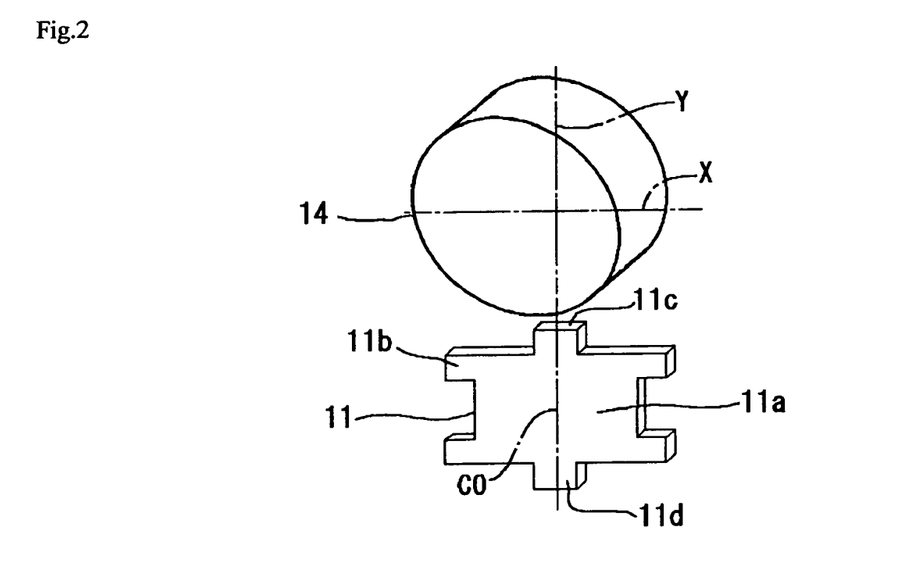
FIG. 2 is an explanatory perspective appearance view showing a core structure of the displacement sensor shown in FIG. 1.

Each of the displacement sensors 10 (a, b, c, d) is constituted in such a manner that a detecting coil 12 is wound around a center core part 11a of a core body 11, which is made of one piece of a thin plate shaped member as shown in FIGS. 1 and 2. A pair of axial end core parts 11c and 11d which are integrally formed with the center core part 11a is respectively provided on both side portions of the center core part 11a in the vertical direction in the drawing via engaging flange parts 11b. Excitation coils 13c and 13d are respectively wound around the pair of axial end core parts 11c and 11d. In FIGS. 1 and 2, only the displacement sensor 10d disposed directly below the rotary shaft 14 of the four displacement sensors 10a, 10b, 10c and 10d is described, but other displacement sensors 10a, 10b and 10c are respectively constituted so as to be completely similar to the displacement sensor 10d, and thus their descriptions are omitted.

In other words, the axial end core part 11c disposed on the upper side in the drawing of the pair of axial end core parts 11c and 11d provided in the displacement sensor 10 is arranged so as to oppose the rotary shaft 14, which is comprised of a metal member or a magnetic body. A direction of axis CO (vertical direction in the drawing), which is the direction from the axial end core part 11c to the axial end core part 11d through the center core part 11a, is set to pass the Y-axis (or X-axis) that is an axis of the rotary shaft 14. In other words, when the rotary shaft 14 is reciprocated along the Y-axis or X-axis direction, that is, along the direction of the axis CO with respect to the axial end core part 11c, the axial end core parts 11c and the rotary shaft 14 are arranged to be approached to or separate from each other while they are opposed to each other. Thus, the position of the rotary shaft 14 is detected through the displacement sensor 10. The displacement sensor 10 may be arranged in such a manner that the displacement sensor 10 is movable with respect to a fixed rotary shaft 14.

More specifically, the center core part 11a of the displacement sensor 10 described above is formed in a nearly center portion of the displacement sensor 10 in an extending direction of the axis CO (vertical direction in the drawing). The width dimension of the center core part 11a, that is, the width dimension W3 in the direction perpendicular to the direction of the axis CO (horizontal direction in the drawing) is formed relatively wider. On the contrary, the respective width dimensions W2 of the both axial end core parts 11c and 11d are set to be narrower than the width dimension W3 of the center core part 11a (W2<W3). Particularly, in the present embodiment, the respective width dimensions W2 of the both axial end core parts 11c and 11d are formed to be not more than half of W3, i.e., the width of the center core part (W2≦W3/2).

Also, a pair of excitation coils 13c and 13d wound around both the axial end core parts 11c and 11d is comprised of a integrally connected serial coil member. In each of the pair of excitation coils 13c and 13d, the respective inner end portions wound around the root portions of both the axial end core parts 11c and 11d are integrally connected by a cross wire 13e in a serial state. On the other hand, the respective lead portions 13f and 13g which are pulled out from the respective tip end side of the both axial end core parts 11c and 11d are respectively connected with both terminal ends of an AC power source 15. A sine wave or a rectangular wave generated from the AC power source 15 is applied to the respective coil winding portions of both the axial end core parts 11c and 11d so as to form opposing magnetic fields ϕ1 and ϕ2 in the opposite directions on the same axis CO.

The engaging flange parts 11b are respectively provided at respective boundary portions between the center core part 11a and the pair of axial end core parts 11c and 11d. Each of the engaging flange parts 11b is formed in a projecting shape protruded in a widthwise direction, which is substantially perpendicular to the direction of the axis CO (direction of X-axis or Y-axis). The respective engaging flange parts 11b are constituted in a shape as a member partitioning between the center core part 11a and each of the axial end core parts 11c and 11d. Accordingly, the respective winding positions of the above-mentioned excitation coils 13c and 13d and the detection coil 12 are positioned by the engaging flange parts 11b in a separated state to each other.

In the displacement sensor 10 in accordance with the present embodiment having such a structure, the detection output provided from the detection coil 12 is dependent on the magnetic field which is equivalent to the sum of the opposing magnetic fields ϕ1 and ϕ2 in the opposite directions generated by the pair of excitation coils 13c and 13d. Accordingly, when the rotary shaft 14 is positioned in a distant place sufficient from the displacement sensor 10, the respective absolute values of the opposing magnetic fields ϕ1 and ϕ2 in the opposite directions are equal to each other (|ϕ1|=|ϕ2|) and thus the output from the detection coil 12 is "zero". On the other hand, when the displacement sensor 10 and the rotary shaft 14 relatively approach each other, an eddy current generated in the rotary shaft 14 varies in correspondence with the variation of the distance between the displacement sensor 10 and the rotary shaft 14. As a result, the balance of the opposing magnetic fields ϕ1 and ϕ2 in the opposite directions is lost and, for example, the magnetic field ϕ2 becomes smaller when the magnetic field ϕ1 becomes larger. The differential output is obtained from the detection coil 12 on the basis of the magnetic field corresponding to the difference (|ϕ1|−|ϕ2|) of the absolute values of the opposing magnetic fields ϕ1 and ϕ2 at that time.

One output is obtained from such a differential state and the output is expressed, for example, by the following expression.

$$\text{Output} = (d\phi 1/dt) - (d\phi 2/dt)$$

wherein
  ϕ1=Asinωt
  ϕ2=Bsinωt (same phase)

In the displacement sensor 10 having the constitution described above, the excitation coils 13c and 13d and the detection coil 12 are discretely arranged. Furthermore, the detection is performed on the basis of the balance of the pair of excitation coils 13c and 13d. Therefore, the amount of the variation of the magnetic flux is directly measured regardless of the impedance by DC resistance component etc. Accordingly, output with satisfactory linearity and high sensitivity can be obtained while the thin and small sized core body 11 is used. Furthermore, the stable detecting operation can be attained regardless of the environmental temperature variation with the inexpensive circuit without using an expensive constant current circuit.

Also, in the present embodiment, the current efficiency in the axial end core parts 11c and 11d is improved by forming the width of the axial end core part 11c placed in the vicinity of the rotary shaft 14 and the axial end core part 11d to be narrower. Thereby, since the magnetic flux is generated further more, the detected amount of the variation, that is, the sensitivity is further enhanced.

Furthermore, in the displacement sensor 10 in accordance with the present embodiment, the engaging flange parts 11b are provided at the boundary portions between the center core part 11a and the axial end core parts 11c and 11d. Therefore, the winding positions of the respective coils 12, 13c and 13d can be accurately determined and thus a phase shift or an output shift is reduced and a large variation rate can be obtained.

Also, in the displacement sensor 10 in accordance with the present embodiment, the output balance between the pair of excitation coils 13c and 13d is set to be in the differential state and thus more accurate detection with a higher sensitivity can be attained. In addition, the temperature characteristic is also satisfactory due to the differential constitution.

Figure 4:
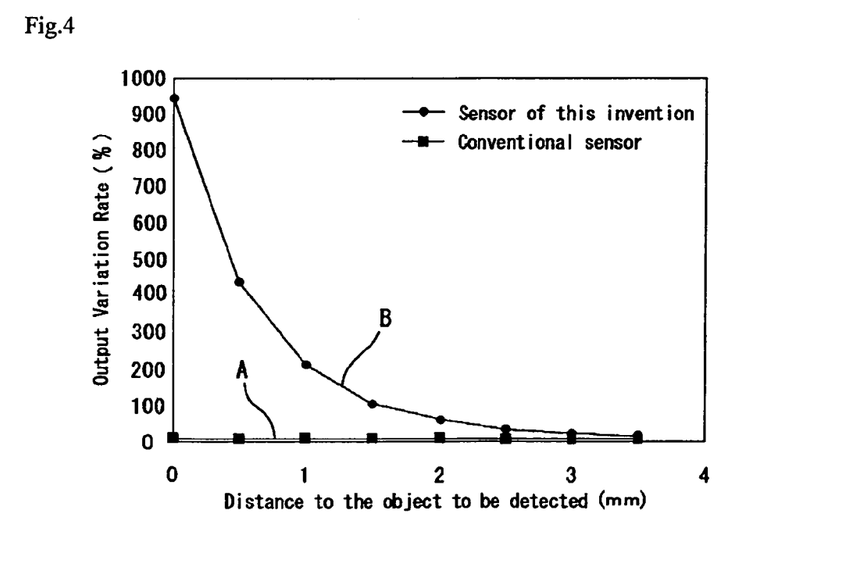
FIG. 4 is a graph which shows a detection output of the displacement sensor used in the displacement measuring device according to the present invention in comparison with a detection output of a conventional sensor.

For example, the displacement sensor 10 in accordance with the present invention, in which the number of turns of the respective excitation coils 13c and 13d are set to be 20T, the number of turns of the detection coil 12 is set to be 40T, the excitation frequency is set to be 1 MHz, and the excitation current is set to be 20 mApp (0.65 V), is compared with a conventional sensor. The compared results are shown in FIG. 4. In FIG. 4, when the output from the detection coil 12 is set to be "1" in the case that the rotary shaft 14 is located at a sufficiently far apart position, the output variation rate (vertical scale in FIG. 4; %) is shown with respect to the distance between the rotary shaft 14 and the displacement sensor 10 (horizontal scale in FIG. 4; mm). The conventional displacement sensor (line "A" in FIG. 4) obtains the amount of variation with only about 10–20%. On the contrary, the displacement sensor 10 (line "B" in FIG. 4) in accordance with the present invention obtains the amount of the variation with 900–950%, which is much larger than that in the conventional sensor.

Furthermore, in the present embodiment, the displacement sensors 10 having such a constitution are arranged in a pair for every two axes X and Y respectively, and thus a further higher resolution and a satisfactory linearity can be obtained. For example, the structure using the single displacement sensor 10 as shown in FIG. 5(a) and the structure using the pair of displacement sensors 10 and 10 as shown in FIG. 5(b) are actually compared to obtain the results as shown in FIG. 6.

Figure 5:
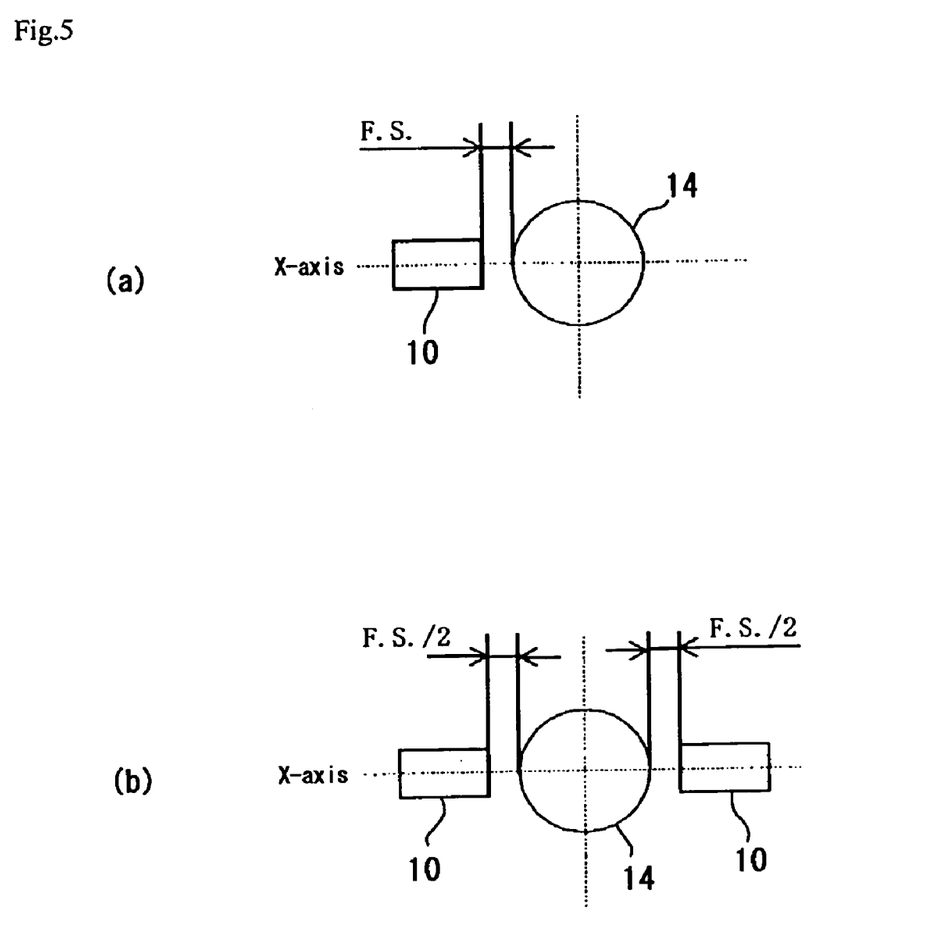
FIG. 5 is an explanatory schematic plan view which shows arrangement of the displacement sensor in the displacement measuring device according to the present invention.
Figure 6:
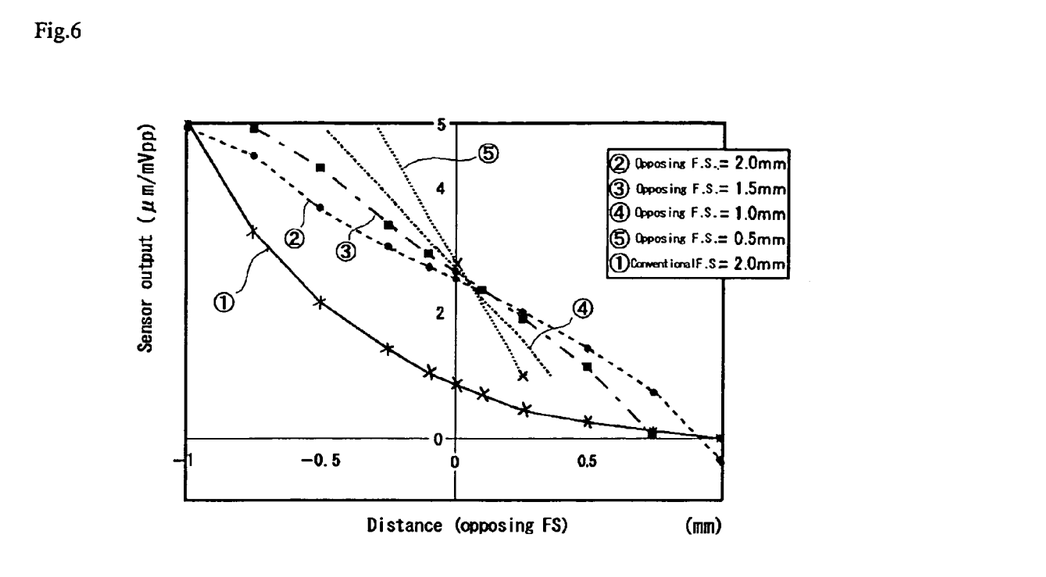
FIG. 6 is a graph showing examples of the detection output obtained by the respective constitutions shown in FIG. 5.

That is, when the single displacement sensor 10 is used as shown in FIG. 5(a), the relationship of the output obtained from the single displacement sensor 10 (vertical scale) with respect to the distance between the displacement sensor 10 and the rotary shaft 14 (horizontal scale; opposing FS) is inversely proportional and expressed in a hollow concave shape as shown by the line ① in FIG. 6. On the other hand, when the pairs of displacement sensors 10 are used as shown in FIG. 5(b), nearly linear relationships are obtained as shown by the lines ② through ⑤ in FIG. 6. Especially, when the distance (opposing FS) between the displacement sensor 10 and the rotary shaft 14 is set to be not more than ½ (FS/2) of that of the case using the single displacement sensor 10, the extremely satisfactory linearity is obtained as shown by the line ④ or ⑤.

The respective resolutions are shown in the following table.

|  | Resolution (actual use vicinity in the drawing 0 mm) |
| --- | --- |
| Conventional F.S. = 2.0 mm | 0.50 (μm/mVpp) |
| Opposing F.S. = 2.0 mm | 0.35 (μm/mVpp) |
| Opposing F.S. = 1.5 mm | 0.19 (μm/mVpp) |
| Opposing F.S. = 1.0 mm | 0.15 (μm/mVpp) |
| Opposing F.S. = 0.5 mm | 0.05 (μm/mVpp) |

Figure 7:
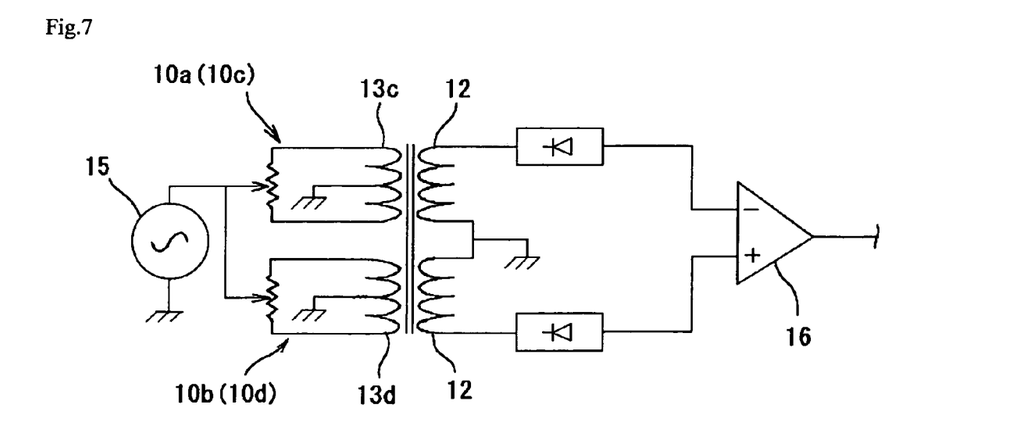
FIG. 7 is a block diagram showing an example of a detection circuit used for the displacement detecting device according to the present invention.

Furthermore, in the present embodiment, the detection output obtained from the displacement sensor 10a (10c) is constituted so as to produce a differential output with the detection output obtained from the displacement sensor 10b (10d) disposed on the opposite side with respect to the rotary shaft 14 by using an appropriate circuit. That is, a detection circuit, for example, as shown in FIG. 7 is respectively installed for every two sensor sets Sx and Sy described above (see FIG. 3). The respective differential outputs of the pair of displacement sensors 10a and 10b and the pair of displacement sensors 10c and 10d, which are respectively provided in the sensor sets Sx and Sy, are obtained through comparators 16. The respective displacement amounts of the rotary shaft 14 in the respective directions of X-axis and Y-axis can be obtained on the basis of the differential outputs from the respective sensor sets Sx and Sy with a further high accuracy and quickness.

As described above, in the present embodiment, since two sensor sets respectively having the pair of displacement sensors 10 are arranged, the detecting operation of the displacement of the rotary shaft 14 can be performed with an extremely high sensitivity and resolution. Also, the variation amount due to the temperature characteristic of the circuit is reduced to about ⅒ of that in the conventional sensor in the range of 10° C. to 40° C.

Figure 8:
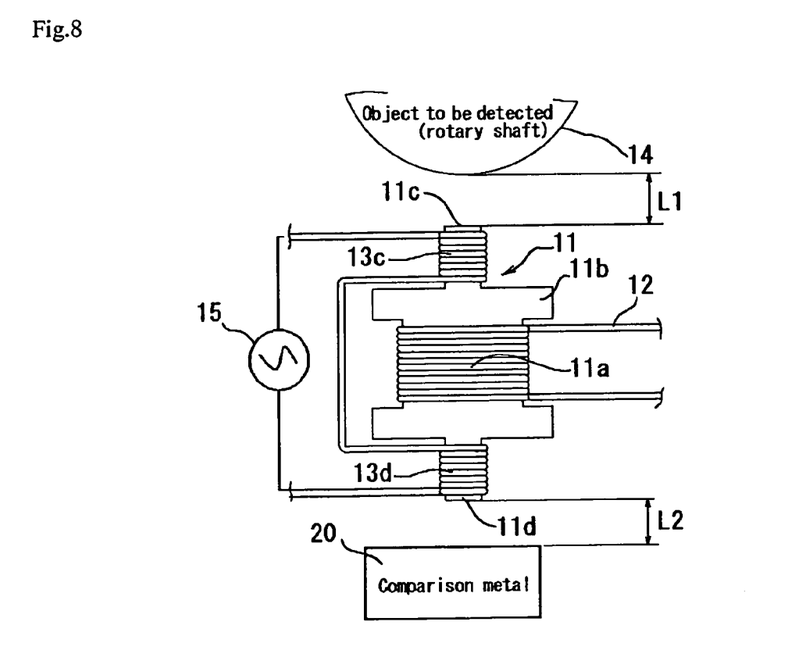
FIG. 8 is an explanatory side view showing a schematic constitution of a displacement sensor in accordance with another embodiment of the present invention.

In the embodiment shown in FIG. 8 in which the same notational symbols are given to the same structural members as those in the above-mentioned embodiment, the axial end core part 11c disposed on the upper side in the drawing of the pair of the axial end core parts 11c and 11d is arranged so as to face with the rotary shaft 14, which is made of a metal member or a magnetic material. Further, the other axial end core part 11d disposed on the lower side in the drawing is arranged so as to face a comparison metal body 20. The comparison metal body 20 is the same material as the rotary shaft 14, a material having nearly the same conductivity as the rotary shaft 14 (non-magnetic material when the rotary shaft 14 is a non-magnetic material), or a material having nearly the same permeability as the rotary shaft 14 (magnetic material when the rotary shaft 14 is a magnetic material). For example, when the rotary shaft 14 is made of aluminum material, copper, ferrite, Permalloy, etc., the same material as aluminum, copper, ferrite or Permalloy is used for the comparison metal body 20, or combinations of the magnetic materials or the nonmagnetic materials are used.

When the above-mentioned rotary shaft 14 moves in the upper or lower direction in the drawing with respect to the displacement sensor 10, the axial end core part 11c is approached to or separated from with respect to the rotary shaft 14 and the distance L1 between the axial end core part 11c and the rotary shaft 14 varies. At this time, the other axial end core part 11d is constituted to maintain at a prescribed position with respect to the comparison metal body 20 without varying the distance L2.

Accordingly, the position where the output from the detection coil 12 becomes "zero" is the position that the distance L2 between the comparison body 20 and the axial end core part 11d is equal to the distance L1 between the axial end core part 11c and the rotary shaft 14. Therefore, when the distance L1 between the axial end core part 11c and the rotary shaft 14 is set to vary within a range which is equal to or smaller than the distance L2 between the comparison metal body 20 and the axial end core part 11d ($0 \leq L1 \leq L2$), a larger variation of the detection output can be taken out and the satisfactory linearity can be obtained.

Figure 9:
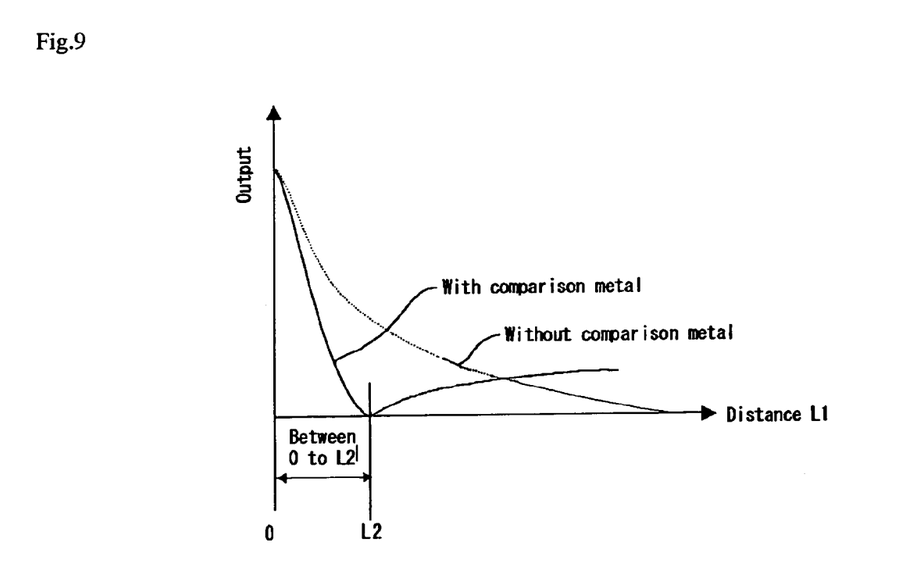
FIG. 9 is a graph showing an adjustment state in the detection area of the displacement sensor shown in FIG. 8.

According to the displacement sensor in accordance with the present embodiment as described above, the difference between the detection output from the rotary shaft 14 side and the detection output from the comparison metal body 20 side is detected as the variation amount. Therefore, by means of changing the distance L2 between the comparison metal body 20 and the axial end core part 11c or changing the material of the comparison metal body 20, the position L2 in the drawing in FIG. 9 where the output from the detection coil 12 becomes "0" can be arbitrarily changed in order to change the required detecting range with respect to the rotary shaft 14, which is shown between the symbol "0" and "L2" in FIG. 9. Consequently, the detecting precision and resolution can be enhanced and the improvement of linearity can be attained by means of obtaining the large amount of the output variation.

In the above-mentioned embodiment, the excitation coils 13c and 13d are disposed on both sides of the detection coil 12 positioned at the center portion. However, on the contrary, detection coils may be arranged on both sides of an excitation coil provided at the center portion.

Further, in the above-mentioned embodiment, the width dimension of the axial end core part 11c is set to be smaller than the width dimension of the center core part 11a (W2<W3). However, both width dimensions may be equal to each other or the inverse relationship to the above embodiment for the width dimensions can be adopted. The cut-off parts in a concave shape are provided at the portion, where the detection coil 12 is wound around, in the center core part 11a of the core body 11 in the above-mentioned embodiment. However, the center core part 11a of the core body 11 may be formed in a simple rectangular shape without such cut off parts.

Figure 10:
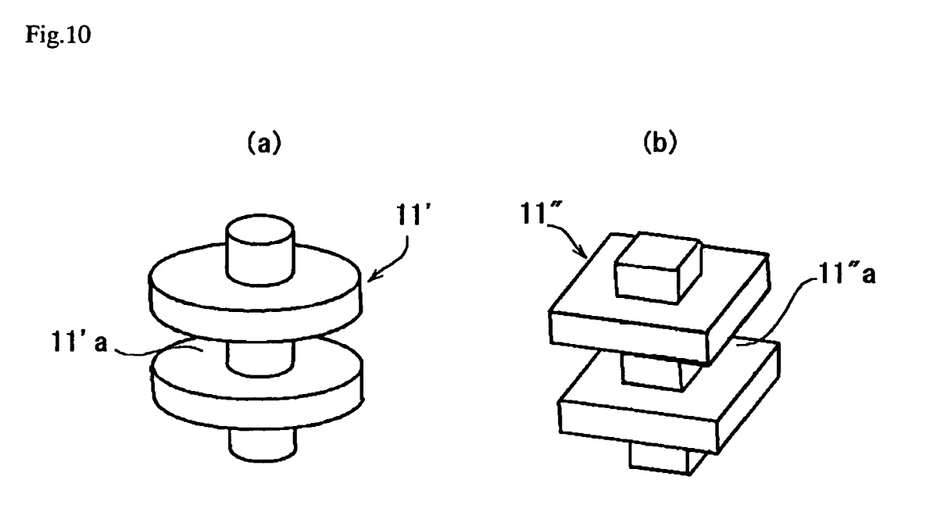
FIG. 10 is an explanatory perspective appearance view showing other examples of a cubic shaped core body.

Furthermore, in the above-mentioned embodiment, one piece of the thin plate member is used as the core body. However, core bodies 11' and 11" in a cubic shape as shown in FIGS. 10(a) and 10(b) may be similarly employed. Also in this case, the center portion of the core body in the axial direction may be formed in a simple shape without forming a cut-off recessed part 11'a or 11"a.

Figure 11:
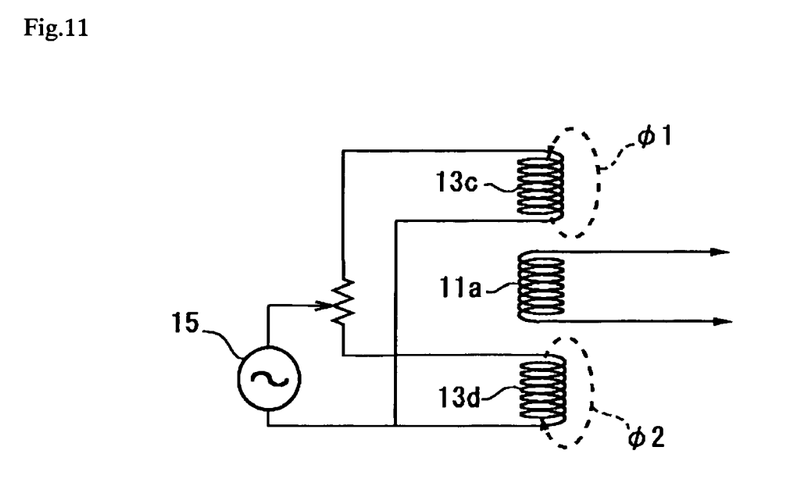
FIG. 11 is an explanatory circuit diagram showing an example of parallel connection of the excitation coils.

In addition, in the above-mentioned embodiment, the pair of excitation coils 13c and 13d is integrally connected in a serial state. However, these respective excitation coils 13c and 13d may be connected in a parallel state with respect to an AC power source 15 to generate the opposing magnetic fields, for example, as shown in FIG. 11.

Furthermore, in the above-mentioned embodiment, although two sensor sets respectively having the pair of displacement sensors are provided, three or more sensor sets may be provided.

INDUSTRIAL APPLICABILITY

As described above, the displacement measuring device in accordance with the present invention is effective to be used in the case, for example, that the object to be detected is a rotary shaft of a magnetically levitated type motor. However, the present invention is not limited to the above-mentioned embodiments, it will be understood that many modifications may be made without departing from the spirit thereof. For example, various types of objects such as coins can be employed as the object to be detected.

The invention claimed is:

1. A displacement measuring device provided with a displacement sensor constituted in such a manner that an output of the displacement sensor is varied in correspondence with a variation of relative position with respect to an object to be detected for detecting the object on the basis of the variation of the output, wherein a sensor set is disposed, which includes a pair of the displacement sensors arranged oppositely facing each other so as to interpose the object between them;

wherein each of the displacement sensors in the sensor set is constituted in such a manner that an excitation coil and a detection coil are respectively wound around and mounted on a core body on the same axis;

wherein one of the excitation coil and the detection coil is mounted on a center core part disposed at a generally center portion in an axial direction of the core body and the other of the excitation coil and the detection coil is mounted on a pair of axial end core parts respectively, which are disposed at both end portions in an axial direction of the core body;

wherein the axial direction of the core body is disposed in a generally same direction as a varying direction of relative position with respect to the object;

wherein one of the pair of axial end core parts and the object are approached to or separated from each other while opposing to each other, further wherein the width dimension of the axial end core parts, in a direction perpendicular to an axial direction of the axial end core parts, are formed narrower than a width dimension of the center core part; and wherein engaging flange parts protruding in a widthwise direction are respectively provided at respective boundary portions between the center core part and the pair of axial end core parts; and winding positions of the excitation coil and the detection coil are restricted at a prescribed position by the respective engaging flange parts; and further comprising a comparison metal body arranged so as to oppose the axial end core part which is positioned on an opposite side of the axial end core part facing the object to be detected.

2. The displacement measuring device according to claim 1, wherein the pair of displacement sensors which are arranged oppositely facing each other is arranged in sets of at least two so as to be perpendicular to each other.

3. The displacement measuring device according to claim 1, wherein the core body is comprised of one piece of a plate shaped member, with the width of the surface oriented in the same direction of the axial end core part, opposed to the object to be detected.

4. The displacement measuring device according to claim 1, wherein the width dimension of the axial end core parts are set to be not more than a half of the width dimension of the center core part.

5. The displacement measuring device according to claim 1, wherein the excitation coil includes a pair of coil winding parts which is formed to generate opposing magnetic fields on the same axis.

6. A displacement measuring device provided with a displacement sensor constituted in such a manner that an output of the displacement sensor is varied in correspondence with a variation of relative position with respect to an object to be detected for detecting the object on the basis of the variation of the output, wherein a sensor set is disposed, which includes a pair of the displacement sensors arranged oppositely facing each other so as to interpose the object between them;

wherein each of the displacement sensors in the sensor set is constituted in such a manner that an excitation coil and a detection coil are respectively wound around and mounted on a core body on the same axis;

wherein one of the excitation coil and the detection coil is mounted on a center core part disposed at a generally center portion in an axial direction of the core body and the other of the excitation coil and the detection coil is mounted on a pair of axial end core parts respectively, which are disposed at both end portions in an axial direction of the core body;

wherein the axial direction of the core body is disposed in a generally same direction as a varying direction of relative position with respect to the object;

wherein one of the pair of axial end core parts and the object are approached to or separated from each other while opposing to each other, further wherein the width dimension of the axial end core parts, in a direction perpendicular to an axial direction of the axial end core parts, are formed narrower than a width dimension of the center core part; and wherein a comparison metal body arranged so as to oppose the axial end core part which is positioned on an opposite side of the axial end core part facing the object to be detected.

7. The displacement measuring device according to claim 6, wherein the pair of displacement sensors which are arranged oppositely facing each other is arranged in sets of at least two so as to be perpendicular to each other.

8. The displacement measuring device according to claim 6, wherein the core body is comprised of one piece of a plate shaped member, with the width of the surface oriented in the same direction of the axial end core part, opposed to the object to be detected.

9. The displacement measuring device according to claim 6, wherein the width dimension of the axial end core parts are set to be not more than a half of the width dimension of the center core part.

10. The displacement measuring device according to claim 6, wherein the excitation coil includes a pair of coil winding parts which is formed to generate opposing magnetic fields on the same axis.

* * * * *